US009182757B2

(12) United States Patent
Holmes (10) Patent No.: US 9,182,757 B2
(45) Date of Patent: Nov. 10, 2015

(54) METHODS AND APPARATUS TO TRANSMIT DEVICE DESCRIPTION FILES TO A HOST (75) Inventor: David Farrell Holmes, Chanhassen, MN (US)

(73) Assignee: FISHER-ROSEMOUNT SYSTEMS, INC., Round Rock, TX (US)

(*) Notice: Subject to any disclaimer, the term of this patent is extended or adjusted under 35 U.S.C. 154(b) by 669 days.

(21) Appl. No.: 13/075,966

(22) Filed: Mar. 30, 2011

(65) Prior Publication Data

US 2012/0254339 A1 Oct. 4, 2012

(51) Int. Cl.
H04L 12/24 (2006.01)
H04W 8/22 (2009.01)
H04W 8/24 (2009.01)
G05B 19/418 (2006.01)

(52) U.S. Cl.
CPC ............ G05B 19/4185 (2013.01); H04L 41/08 (2013.01); H04L 41/0806 (2013.01); H04W 8/24 (2013.01); G05B 2219/00 (2013.01); G05B 2219/31121 (2013.01); G05B 2219/31334 (2013.01); G05B 2219/31422 (2013.01); G05B 2219/32144 (2013.01); H04W 8/22 (2013.01)

(58) Field of Classification Search
CPC .................. G05B 19/4185; G05B 2219/31121; G05B 2219/31334; G05B 2219/31422; G05B 2219/32144; H04L 41/08; H04L 41/0806; H04W 8/24; H04W 8/22
See application file for complete search history.

(56) References Cited

U.S. PATENT DOCUMENTS

| 5,390,314 | A | | 2/1995 | Swanson |
| 5,768,119 | A | * | 6/1998 | Havekost et al. ................. 700/4 |
| 5,796,602 | A | * | 8/1998 | Wellan et al. ..................... 700/1 |
| 5,828,851 | A | | 10/1998 | Nixon et al. |
| 5,864,870 | A | | 1/1999 | Guck |
| 5,903,455 | A | * | 5/1999 | Sharpe et al. .................. 700/83 |
| 5,960,214 | A | | 9/1999 | Sharpe, Jr. et al. |
| 5,978,850 | A | | 11/1999 | Ramachandran et al. |
| 6,219,718 | B1 | | 4/2001 | Villalpando |
| 6,278,960 | B1 | | 8/2001 | De Groot |
| 6,330,517 | B1 | | 12/2001 | Dobrowski et al. |
| 6,581,101 | B2 | | 6/2003 | Villalpando |
| 6,618,630 | B1 | | 9/2003 | Jundt et al. |
| 6,970,771 | B1 | | 11/2005 | Preiss et al. |

(Continued)

FOREIGN PATENT DOCUMENTS

DE 10 2007 047061 4/2009

OTHER PUBLICATIONS

Patent Cooperation Treaty, International Search Report, issued in connection with International application No. PCT/US2012/031155, mailed on Jul. 5, 2012, 4 pages.

(Continued)

Primary Examiner — Patrice Winder
Assistant Examiner — Angela Widhalm
(74) Attorney, Agent, or Firm — Hanley, Flight & Zimmerman, LLC (57) ABSTRACT Example methods and apparatus to transmit device description files to a host are disclosed. A disclosed example method includes communicatively coupling a field device to the host to provision the field device within a process control system, receiving an indication that the host does not include a version of a device description file that corresponds to a version of the field device, accessing the device description file from a memory of the field device, and transmitting the device description file from the field device to the host.

20 Claims, 6 Drawing Sheets

(56) References Cited

U.S. PATENT DOCUMENTS

| | | | |
|---|---|---|---|
| 7,062,580 B2 * | 6/2006 | Donaires | 710/104 |
| 7,072,987 B2 * | 7/2006 | Jurisch et al. | 709/249 |
| 7,089,491 B2 | 8/2006 | Feinberg et al. | |
| 7,096,224 B2 | 8/2006 | Murthy et al. | |
| 7,142,990 B2 * | 11/2006 | Bouse et al. | 702/35 |
| 7,146,230 B2 | 12/2006 | Glanzer et al. | |
| 7,162,534 B2 | 1/2007 | Schleiss et al. | |
| 7,178,103 B2 | 2/2007 | Humphrey et al. | |
| 7,251,534 B2 | 7/2007 | Walls et al. | |
| 7,266,812 B2 * | 9/2007 | Pagnano | 717/136 |
| 7,317,952 B2 | 1/2008 | Bhandiwad et al. | |
| 7,580,992 B2 * | 8/2009 | Eisenbeis et al. | 709/221 |
| 7,720,727 B2 * | 5/2010 | Keyes et al. | 705/30 |
| 7,783,790 B2 | 8/2010 | Meyer et al. | |
| 7,913,246 B2 * | 3/2011 | Hammond et al. | 717/173 |
| 7,984,199 B2 * | 7/2011 | Ferguson et al. | 710/8 |
| 8,019,724 B2 * | 9/2011 | Koniki et al. | 707/626 |
| 8,190,566 B2 * | 5/2012 | Giampaolo et al. | 707/611 |
| 8,392,602 B2 * | 3/2013 | VanGompel | 709/236 |
| 2003/0208587 A1 | 11/2003 | Sauer | |
| 2003/0229472 A1 | 12/2003 | Kantzes et al. | |
| 2004/0225491 A1 | 11/2004 | Chang | |
| 2004/0230582 A1 | 11/2004 | Pagnano et al. | |
| 2004/0230899 A1 | 11/2004 | Pagnano et al. | |
| 2004/0243933 A1 | 12/2004 | Becker et al. | |
| 2005/0071522 A1 | 3/2005 | DeGroot | |
| 2005/0120029 A1 | 6/2005 | Tomic et al. | |
| 2006/0074499 A1 | 4/2006 | Hamidpour | |
| 2006/0206659 A1 | 9/2006 | Anne et al. | |
| 2006/0259456 A1 | 11/2006 | Falk et al. | |
| 2007/0067512 A1 * | 3/2007 | Donaires et al. | 710/62 |
| 2007/0067725 A1 | 3/2007 | Cahill et al. | |
| 2007/0075916 A1 | 4/2007 | Bump et al. | |
| 2007/0078540 A1 | 4/2007 | Bump et al. | |
| 2007/0143330 A1 | 6/2007 | Tang | |
| 2007/0244584 A1 * | 10/2007 | John et al. | 700/86 |
| 2007/0250180 A1 | 10/2007 | Bump et al. | |
| 2007/0255520 A1 | 11/2007 | Becker et al. | |
| 2007/0282463 A1 | 12/2007 | Hodson et al. | |
| 2008/0016189 A1 * | 1/2008 | Yoo | 709/220 |
| 2008/0112388 A1 | 5/2008 | Garrett et al. | |
| 2009/0234465 A1 | 9/2009 | Korsten | |
| 2011/0153036 A1 * | 6/2011 | Colucci et al. | 700/71 |
| 2011/0191500 A1 * | 8/2011 | Odayappan et al. | 710/8 |
| 2011/0295978 A1 * | 12/2011 | Pazos et al. | 709/219 |
| 2012/0054599 A1 * | 3/2012 | Nixon et al. | 715/236 |
| 2012/0093242 A1 * | 4/2012 | Wallace et al. | 375/259 |

OTHER PUBLICATIONS

Patent Cooperation Treaty, Written Opinion of the International Searching Authority, issued in connection with International application No. PCT/US2012/031155, mailed on Jul. 5, 2012, 5 pages.

Unknown Author, "Why Should You Choose EDDL: Easier Calibration," EDDL, www.eddl.org Mar. 3, 2008, 2 pages.

Rolf Birkhofer, XML for Automotion Devices, a Multi-Schema Approach, XML Europe, May 21-25, 2001, 33 pages.

Terry Blevins, "EDDL Overview," NeSSI Meeting, EDDL, Feb. 16, 2007, 69 pages.

Martin Fowler, "Language Workbenches: The Killer-App for Domain Specific Languages?" martinfowlercom; Jun. 12, 2005, 24 pages.

Karlsruhe, "Welcome to the NAMUR EDDL Workshop with ECT," EDDL, May 22, 2006, 47 pages.

Patent Cooperation Treaty, "International Preliminary Report on Patentability," issued in connection with Application No. PCT/US2012/031155, Oct. 1, 2013, 6 pages.

European Patent Office, "Communication pursuant to Rules 161 (1) and 162 EPC", issued in connection with European patent application No. 12714453.3, Nov. 7, 2013, 2 pages.

International Bureau, "International Preliminary Report on Patentability," issued in connection with International Patent Application No. PCT/US2012/031155, mailed Oct. 10, 2013, 6 pages.

* cited by examiner

METHODS AND APPARATUS TO TRANSMIT DEVICE DESCRIPTION FILES TO A HOST

FIELD OF THE DISCLOSURE

The present disclosure relates generally to process control systems and, more particularly, to methods and apparatus to transmit device description files to a host.

BACKGROUND

Process control systems, like those used in chemical, petroleum or other processes, typically include one or more process controllers and input/output (I/O) devices communicatively coupled to at least one host or operator workstation and to one or more field devices via analog, digital or combined analog/digital buses. The field devices, which may be, for example, valves, valve positioners, switches and transmitters (e.g., temperature, pressure and flow rate sensors), perform process control functions within the process such as opening or closing valves and measuring process control parameters. The controllers receive signals indicative of process measurements made by the field devices, process this information to implement a control routine, and generate control signals that are sent over the buses or other communication lines to the field devices to control the operation of the process. In this manner, the controllers may execute and coordinate control strategies or routines using the field devices via the buses and/or other communication links communicatively coupling the field devices.

Information from the field devices and the controllers may be made available to one or more applications (i.e., routines, programs, etc.) as runtime data executed by the operator workstation (e.g., a processor-based system) to enable an operator to perform desired functions with respect to the process. Some of these functions may include viewing the current state of the process (e.g., via a graphical user interface), evaluating the process, modifying the operation of the process (e.g., via a visual object diagram), etc. Many process control systems also include one or more application stations. Typically, these application stations are implemented using a personal computer, workstation, or the like that is communicatively coupled to the controllers, operator workstations, and other systems within the process control system via a local area network (LAN). Each application station may execute one or more strategies, routines, or applications that perform campaign management functions, maintenance management functions, virtual control functions, diagnostic functions, real-time monitoring functions, safety-related functions, configuration functions, etc. within the process control system.

To view information from field devices, an application station utilizes one or more device description files. Manufacturers of field devices use device description files to provide a standardized form and/or structure for an application station to access and display process control information independent of a communication protocol (e.g., Hart®, Foundation Fieldbus™, and Profibus®) and/or a device operating system (e.g., Windows, Android, Blackberry OS, iOS, etc.). Currently, manufacturers provide a device description file separate from a corresponding field device. When the field device is installed into a process control system, process control personnel install the device description file within an application station communicatively coupled to the field device.

SUMMARY

Example methods and apparatus to transmit device description files to a host are described. In one example, a method includes communicatively coupling a field device to the host to provision the field device within a process control system and receiving an indication that the host does not include a version of a device description file that corresponds to a version of the field device. The example method further includes accessing the device description file from a memory of the field device and transmitting the device description file from the field device to the host.

An example apparatus includes a device type identifier to identify a host communicatively coupled to a field device within a process control system and a file processor to receive an indication that the host does not include a device description file that corresponds to a version of the field device. The example apparatus also includes a file retriever to access the device description file from a memory of the field device and a transmitter to transmit the device description file from the field device to the host.

DETAILED DESCRIPTION

Although the following describes example methods and apparatus including, among other components, software and/or firmware executed on hardware, it should be noted that these examples are merely illustrative and should not be considered as limiting. For example, it is contemplated that any or all of the hardware, software, and firmware components could be embodied exclusively in hardware, exclusively in software, or in any combination of hardware and software. Accordingly, while the following describes example methods and apparatus, persons of ordinary skill in the art will readily appreciate that the examples provided are not the only way to implement such methods and apparatus. For example, while the example methods and apparatus are described in connection with transmitting device description files to a host within a process control system, the example methods and apparatus are more generally applicable and may be implemented to transmit device description files within any automation system, batch processing system, manufacturing system, industrial control system, safety instrumented system, etc.

Process control systems generally include controllers to perform routines, control strategies, and/or algorithms that manage field devices located in the control system. The field devices may be, for example, valves, valve positioners, switches and transmitters, and may perform process control functions such as opening or closing valves and measuring process control parameters. In addition to managing field devices, controllers may generate process data (e.g., process control information) based on information received from the field devices. The process data may include process statistics, alarms, monitoring information, process trend information, diagnostic information, field device status information, and/ or messages from the field devices.

Controllers transmit process data to applications operating on hosts (e.g., workstations, computers, tablet computers laptops, servers, handheld devices, portable devices, wireless devices, smartphones, and/or any other computing device) so that operators may manage a process control system. Typically, applications display process data as at least one graphical data representation in a user interface. Data representations are helpful to operators as these data representations typically display process data graphically in the form of charts, graphs, data tables, list boxes, graphical symbols, text, etc. The data representations and corresponding text within the user interface are generally displayed in a format and/or language associated with a locale of an operator viewing the information.

In many known systems, hosts display process data from field devices using corresponding device description files (e.g., electronic device description language (EDDL) files). Currently, many well-known process control communication protocols support the use of device description files. These process control communication protocols include, for example, Foundation Fieldbus™, Hart® Communication Foundation, and Profibus®. Further, the Field Device Integration (FDI) standard supports the use of device description files to create a universal toolset used by process control personnel to manage field devices communicatively coupled together within control systems.

Currently, device description files conform to a text-based language that is used to describe characteristics, parameters, and/or functions of field devices. This functionality may include, for example, menu system descriptions, general device information, diagnostics, performance analysis information, operational statistics, parameterization information, range setup information, simulation parameters, override information, calibration trim information, monitoring information, device security protocols, and/or reset information. Manufacturers of field devices use device description files to provide a standardized form and/or structure for hosts to access and display process data independent of a communication protocol and/or a device operating system (e.g., Windows, Android, Blackberry OS, iOS, etc.).

In many instances, device description files are transported to a process control environment along with a corresponding field device. For example, a pressure transmitter field device may be shipped by a manufacturer to a process control system with a device description file stored separately on a tangible machine readable medium (e.g., a compact disk (CD)). In other examples, process control personnel may download a device description file to a host from a database (e.g., a website) of a manufacturer of the pressure transmitter field deice.

To configure a process control system to display process data generated by a field device, process control personnel currently have to install a field device into a process control system (e.g., provision a field device), communicatively couple the field device to a controller, and install a device description file associated with the field device on one or more hosts communicatively coupled to the controller. In this manner, a user of a host with the device description file can access and/or view process data generated by the associated field device. In other examples, process control personnel may store the device description file to a central database that is accessible by multiple hosts within a process control system.

A device description file is typically separate from a field device because the field device is installed within a process control system while the device description file is installed independently within one or more hosts. Additionally, because memory was previously relatively expensive, many currently active field devices have relatively small memories that cannot accommodate storing a device description file in addition to storing coded instructions needed to operate the field device. However, with decreases in the cost of memory, many field device manufacturers are including relatively larger memories within field devices.

Another reason a device description file is typically separate from a field device is due to capacity limitations of process control communication protocols. Typically, communication protocols such as, for example, Hart®, Foundation Fieldbus™, and Profibus® primarily support the transfer of process data from a field device to a controller and/or a host. Many process control communication protocols provide relatively little support for transferring a file from a field device to one or more hosts. In many instances, a data bus that is utilized by a process control communication protocol is bandwidth limited because the data bus is primarily designed to transfer relatively small amounts of process data in a relatively highly reliable manner. In other instances, process control communication protocols may not support messages and/ or other functionality to transfer a device description file.

Because device description files are separate from field devices, process control personnel may experience issues trying to configure a device description file for a particular field device. For example, a device description file shipped separate from a field device may not be compatible with the field device (e.g., the file is for a different type and/or model of field device). In other instances, a device description file may be for a newer or older version of a field device. In yet other instances, process control personnel may configure a field device to support certain functions but do not modify an associated device description file to reflect the supported functions. In further instances, a device description file may be misplaced or lost. Additionally, many hosts may be isolated within a process control system, thereby making it difficult for process control personnel to install a device description file on each host.

The example methods and apparatus described herein enable a device description file to be stored within a memory of a field device. In this manner, the methods and apparatus described herein transmit the device description file via a process control communication protocol to one or more hosts, thereby enabling users to view process data generated by a field device. The example methods and apparatus described herein utilize a file transfer routine that may be implemented for any process control communication protocol. The file transfer routine identifies which hosts are communicatively coupled to a field device, identifies which of those coupled hosts do not have the device description file, and transmits the device description file to the identified hosts.

To implement the file transfer routine, the example methods and apparatus described herein utilize file transfer messages that conform to process control communication protocols to enable a device description file to be transferred from a field device to a host. The file transfer messages include, for example, host request messages, host response messages, communication link establishment messages, acknowledgment messages, and/or device description file transfer messages. While the example methods and apparatus describe some example messages to transfer a device description file from a field device to a host, other types of messages may be used.

In some examples, the methods and apparatus described herein use an identifier of a host (e.g., a workstation) to determine a device description file stored in a field device that is associated with a type of the host. For example, the methods and apparatus described herein may determine that a host is a handheld process control communicator (e.g., a Fisher-Rosemount 375 Field Communicator) that has a relatively small screen area. Upon determining the host type, the example methods and apparatus described herein select a device description file that is configured to display process data on the relatively small screen.

By storing a device description file to a field device, the example methods and apparatus described herein ensure that each host that displays process data generated by the field device has the appropriate device description file. Further, in examples where a manufacturer pre-configures a field device, the manufacturer may also modify and store a device description file to the field device associated with the configuration. Additionally, by transmitting a device description file to one or more hosts upon provisioning a field device within a process control system, the example methods and apparatus described herein reduce a time to setup the device description file in the one or more hosts.

Thus, the example methods and apparatus described herein provide reasonable assurance to manufacturers of field devices that a correct version of a device description file will be installed to support a specific version of a field device. For example, many manufacturers may delay providing a device description file. By storing a device description file to a corresponding field device, the example methods and apparatus described herein reduce delays between provisioning a field device and an installation of the device description file.

Figure 1:
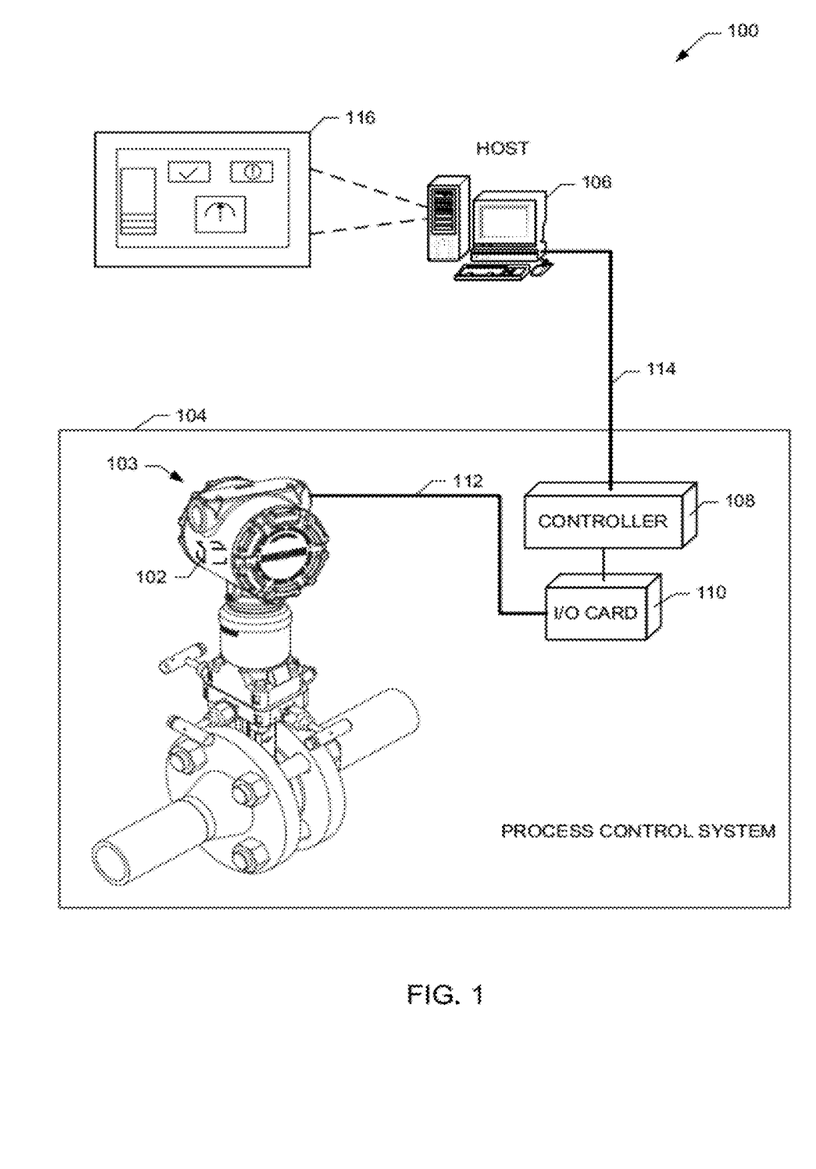
FIG. 1 shows a diagram of an example process control environment including an example file manager that maybe used to carry out the example methods and apparatus described herein.

FIG. 1 shows a diagram of an example process control environment 100 including an example file manager 102 that maybe used to carry out the example methods and apparatus described herein. The example file manager 102 is included within a field device 103 located within a process control system 104. In this example, the field device 104 is communicatively coupled to a host 106 (e.g., a workstation) via a controller 108 and an I/O card 110. A communication path 112 couples the field device 103 to the I/O card 110. The communication path 112 may conform to any wired and/or wireless process control communication protocol including, for example, Foundation Fieldbus™, Hart®, and/or Profibus®.

The example process control system 104 may include any type of manufacturing facility, process facility, automation facility, safety instrumented facility, and/or any other type of process control structure or system. In some examples, the process control system 104 may include multiple facilities located at different locations within the process control environment 100. Additionally, the example process control environment 100 may include other process control systems (not shown) that may be included within the same facility and/or located at a different facility.

While the process control system 104 shows the field device 103, the process control system 104 may include other field devices (not shown) communicatively coupled to the controller 108 and/or other controllers (not shown). Additionally, while the process control system 104 shows the controller 108 and the I/O card 110, the process control system 104 may include additional controllers, I/O cards, and/or any other devices to communicatively couple one or more field devices to the host 106. In other examples, the host 106 may be communicatively coupled to other process control systems (not shown).

The example controller 108 uses control routines to calculate process data based on outputs from the field device 103 for applications including, for example, monitoring applications, alarm management applications, process trending and/or history applications, diagnostic applications, batch processing and/or campaign management applications, statistical applications, streaming video applications, advanced control applications, safety instrumented applications, event applications, etc. The controller 108 forwards process data to the host 106 and/or any other process control database and/or processor (not shown) at periodic intervals and/or upon processing or generating the process data. The process data transmitted by the controller 108 may include process control values, data values, alarm information, text, block mode element status information, diagnostic information, error messages, parameters, events, and/or device identifiers.

The I/O card 110 (e.g., one or more I/O cards) receives data from the field device 103 and converts the data into communications capable of being processed by the example controller 108. Likewise, the I/O card 110 may convert data or communications from the controller 108 into a data format capable of being processed by the field device 103.

In the illustrated example, the controller 108 is coupled to the host 106 via a local area network (LAN) 114. The LAN 114 may be implemented using any communication medium and protocol. For example, the LAN 114 may be based on a hardwired or wireless Ethernet communication scheme. However, any other suitable communication medium and protocol could be used. Furthermore, although the single LAN 114 is shown, more than one LAN and appropriate communication hardware within the host 106 may be used to provide redundant communication paths between the host 106 and a respective similar workstation (not shown).

The example host 106 of FIG. 1 may include any computing device such as a personal computer, a tablet computer, a laptop, a server, a handheld device, a portable device, a wireless device, a smartphone, etc. The host 106 may be implemented using any suitable computer system or processing system (e.g., the processor system P10 of FIG. 7). For example, the host 106 could be implemented using a single processor personal computer, single or multi-processor workstations, etc.

The example host 106 displays process control applications via a user interface 116. The user interface 116 uses device description files to render process data in a graphical format to enable a user of the host 106 to graphically view (via an application) the process data generated by the field device 103. Additionally, the example user interface 116 enables a user to manage the process control system 104 by providing graphical instrumentality that the user may select and/or manipulate to cause the host 106 to send instructions to the controller 108.

A device description file enables the host 106 to display process data generated by the field device 103 by defining functionality associated with the field device 103, including output parameters. For each of the output parameters, a device description file specifies a type of the process data, thresholds, specified ranges of the process data, and/or how the process data included within the output parameters is to be displayed (e.g., via a chart, graph, text field, status indicator, numeric field, etc.). A device description file may also specify a location within the user interface 116 where a graphical representation of the process data of the output parameters is to be displayed. Further, the device description files may specify a parameter and/or variable that matches a format of the process data.

Generally, the field device 103 receives instructions from the controller 108 via the communication path 112 to execute a specified operation (e.g., measure a pressure of a fluid) and cause a change to the process implemented and/or controlled by the field device 103 (e.g., regulate the pressure of the fluid). The field device 103 measures process data, environmental data, and/or input device data and transmits the measured data via the communication path 112 to the controller 108 as process data.

The example field device 103 is provisioned within the process control system 104, for example, by process control personnel installing the field device 103 on an object and/or within a fluid to be measured and communicatively coupling the field device 103 to the controller 108 via the communication path 112 and the I/O card 110. The field device 103 may also be provisioned by process control personnel assigning an identifier to the field device 103 to enable the field device 103 to be communicatively located within the process control system.

In the illustrated example of FIG. 1, the process control environment 100 shows the example field device 103 as a pressure transmitter (e.g., a Rosemount 30515 Series Pressure Transmitter). The pressure transmitter field device 103 measures a pressure of a fluid within, for example, a pipe. The pressure transmitter field device 103 calculates and transmits a measured pressure to the host 106 via the controller 108. The pressure transmitter field device 103 may also transmit status information, diagnostics, alarm information, event information, and/or any other type of process data to the host 106.

The pressure transmitter field device 103 is shown for illustration purposes only and in other examples, the field device 103 could include any type of field device or process control component capable of receiving inputs, generating outputs, and/or controlling a process. For example, other types of field devices include, for example, valves, pumps, fans, heaters, coolers, and/or mixers to control a process. In these other examples, the field device 103 may include measurement or monitoring devices such as, for example, temperature sensors, pressure sensors, concentration sensors, fluid level meters, flow meters, and/or vapor sensors to measure portions of a process.

Figure 2:
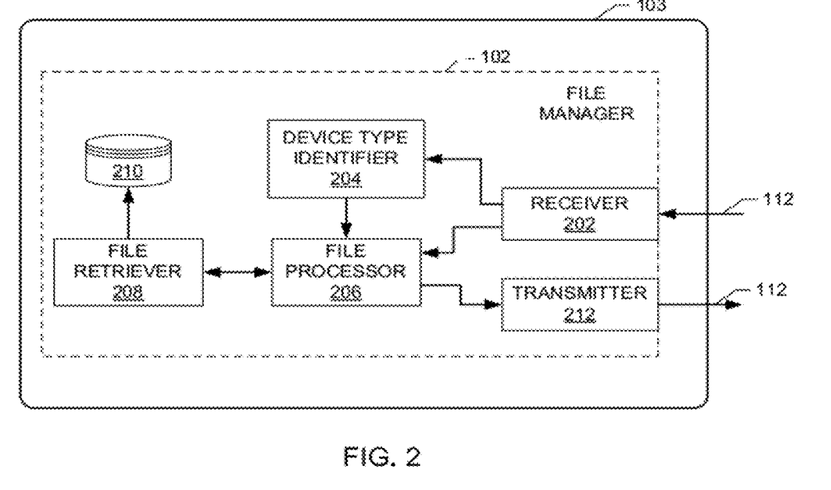
FIG. 2 shows a functional block diagram of the example file manager of FIG. 1.

In the example of FIG. 1, the file manager 102 is shown included within the pressure transmitter field device 102. The illustrated example shows a functional depiction of the file manager 102. In other examples, the file manager 102 may be located within a processor (e.g., a microcontroller) and/or on a circuit board included within an electronics housing of the field device 103. While the file manager 102 is shown within the field device 103, in other examples, the file manager 102 may be included within the host 106 and/or a processor communicatively coupled to the host 106. In these other examples, the file manager 102 extracts a device description stored within the field device 103.

The example file manager 102 transmits a device description file corresponding to the field device 103 to the host 106 after the field device 103 is provisioned within the process control system 104. The file manager 102 may identify a type of the host 106 and select a device description file appropriate for the type of the host 106. The file manager 102 may also transmit broadcast requests to the process control system 104 to locate any other hosts (not shown). The file manager 102 may access a memory internal to the field device 103 for the device description file. In other instances, the file manager 102 may functionally include a memory for the device description files. The file manager 102 is described in further detail in conjunction with FIG. 2.

FIG. 2 shows a functional block diagram of the example file manager 102 of FIG. 1. In this example, the file manager 102 is shown included within the field device 103. While the file manager 102 is shown directly communicatively coupled to the communication path 112, in other examples the file manager 102 may be coupled to the communication path 112 via wiring and/or other electronics within the field device 103. In some examples, the field device 103 may include multiple file managers 102 to support multiple concurrent transmissions of device description files to communicatively coupled hosts.

To receive messages from, for example, the host 106, the file manager 102 of FIG. 2 includes a receiver 202. The example receiver 202 routes messages based on a type of the message. For example, messages from the host 106 that identify a type of the host 106 are routed to a device type identifier 204. In other instances, messages from the host 106 associated with transmitting one or more device description file(s) are routed to a file processor 206. The receiver 202 may also route messages to the file processor 206 from the host 106 indicating whether a device description file is already installed at the host 106. The example receiver 202 may also convert messages associated with a process control communication protocol into a format compatible with the file manager 102.

The example device type identifier 204 uses information provided by, for example, the host 106 to determine a type of the host 106. For example, the file manager 102 may transmit a broadcast message to the host 106, which causes the host 106 to transmit a message that includes an electronic address of the host 106 and/or an identifier of the host 106. In this example, the device type identifier 204 uses the identifier to determine a type of the host 106. The electronic address may include, for example, an Internet Protocol (IP) address, a LAN address, a directory location of the host 106, and/or an address associated within the process control system 104.

The device type identifier 204 may determine the type of the host 106 by cross-referencing via a list the identifier to a device type. In examples where the identifier is a media access control (MAC) address, the device type identifier 204 may cross-reference the MAC address to a device type. In other examples, the device type identifier 204 may determine that the identifier corresponds to a device (e.g., the host 106) that has a relatively large or relatively small display monitor (e.g., the user interface 116). The type of the host 106 may further be identified by, for example, a model number of the host 106 and/or a type of a processor included within the host 106.

After determining a type of the host 106, the device type identifier 204 transmits a message to the file processor 206 including the type of the host 106 and/or an electronic address of the host 106. The example file processor 206 manages the transfer of device description files to hosts. When the field device 103 is provisioned and/or configured, the file processor 206 receives an indication that the field device 103 is active and/or functional. The indication may include a message from a processor of the field device 103 and/or an indication (e.g., a signal) that the field device 103 is powered.

In response to the indication, the file processor 206 transmits a broadcast message (e.g., a query) generally directed to any host in the process control system 104 requesting responses with identifiers from the communicatively coupled hosts. The query may also request the hosts to determine if a device description file associated with the field device 103 is included within the hosts. For hosts that include the device description file, the query may also request a version, a release date, and/or a revision of the device description file.

The example file processor 206 maintains a list of hosts communicatively coupled to the field device 103 based on responses from the hosts. In some examples, the file processor 206 may periodically (e.g., daily, weekly, etc.) transmit broadcast messages to determine if any new hosts are communicatively coupled to the field device 103. In other examples, the controller 108 and/or a server may maintain a list of communicatively coupled hosts. In these examples, the file processor 206 accesses the list from the controller 108 and/or the server. In yet other examples, the file processor 206 may receive request messages for a device description file from a host upon the host communicatively coupling to the field device 103.

For each host coupled to the field device 103, the file processor 206 uses a type of the host provided by the device type identifier 204 to instruct a file retriever 208 to access an appropriate device description file. Further, for each host that responds indicating that the host includes an improper (e.g., newer or older) version, revision, and/or release data of the device description file, the file processor 206 instructs the file retriever 208 to access the stored device description file so that the file processor 206 can provide the appropriate device description file to the host. The file processor 206 may also compare a version of the field device 103 to determine if device description files already included within the hosts are compatible with the field device 103. In examples where a host responds with a correct and/or appropriate version, revision and/or release date of a device description file, the file processor 206 does not transmit a stored device description file to the host.

To transmit a device description file to a host (e.g., the host 106), the file processor 206 establishes a communication link within the host (e.g., a virtual circuit). For some process control communication protocols, the file processor 206 establishes the communication link by transmitting messages, including the device description file, to the host that include an electronic address of the host. In this manner, the messages propagate to the controller 108 and are directed to, for example, the host 106 via the LAN 114. In this example, the file processor 206 transmits the device description file within relatively small data packets of a transfer message.

In other examples, the file processor 206 may establish a virtual circuit through the process control system 104 by specifying I/O ports on the I/O card 110, interfaces on the controller 108, and/or any switching interfaces on any routers so that the device description file can be streamed to the host. In these examples, the device description file may be transferred in relatively larger packets and/or messages to the appropriate host.

In yet other examples, the file processor 206 may create a temporary storage location on the controller 108, the host 106, and/or a server and transfer the device description file to this temporary location. From this temporary location, the file processor 206 can stream and/or copy the device description file to other hosts. In this manner, the file processor 206 only has to transfer the device description file once over a relatively bandwidth limited process control communication protocol to the temporary location and can utilize a relatively higher bandwidth connection (e.g., the LAN 114) to remotely transfer the device description file to other hosts.

In some examples, the file processor 206 may also configure a device description file based on activated and/or enabled functionality of the field device 103. For example, after receiving an indication that the field device 103 is provisioned, the file processor 206 may communicate with a processor of the field device 103 to determine which features, functions, and/or components are enabled, licensed, configured, and/or otherwise activated (e.g., via configuration blocks). The file processor 206 may then send instructions to the file retriever 208 to update and/or modify a device description file so that the file reflects the enabled features, functions, and/or components of the field device 103.

To retrieve and/or manage device description files, the file manager 102 of FIG. 2 includes the file retriever 208. The example file retriever 208 is communicatively coupled to a device descriptor file memory 210. While the example device descriptor file memory 210 is shown within the file manager 102, in other examples, the device descriptor file memory 210 may be exterior to the file manager 102 within the field device 103. The device descriptor file memory 210 may be implemented by Electronically Erasable Programmable Read-Only Memory (EEPROM), Random Access Memory (RAM), Read-Only Memory (ROM), and/or any other type of memory.

Device description file(s) are stored to the device descriptor file memory 210 during a manufacturing process of the field device 103. In some instances, a manufacturer may configure the device description file(s) based on features, functionality, and/or components included within the manufacture of the field device 103. For example, if a manufacturer includes a temperature sensor within the field device 103, the manufacturer may add functional descriptions and parameter display information associated with the temperature sensor to a device description file prior to storing the file in the device descriptor file memory 210. Manufacturers may also store multiple versions of a device description file configured for different types of hosts.

Additionally, in some examples, the device description file(s) may be stored in a compressed format to reduce utilization of the device descriptor file memory 210 and/or to reduce transmission time to a host. A device description file may be compressed using any type of file compression or tokenization method. In these examples, the file processor 206 may uncompress the device description file or, alternatively, the host may uncompress the device description file.

The example file retriever 208 of the illustrated example receives instructions from the file processor 206 to access a device description file, accesses the memory 210 for the requested file, and transmits the file (or a copy of the file) to the file processor 206. In some examples, the file retriever 208 may receive an instruction that includes a type of a host. In these examples, the file retriever 208 locates a device description file configured to be displayed by the type of the host. The file retriever 208 may use metadata within a device description file to identify with which types of hosts the file is compatible. In other examples, the file retriever 208 may access a list within the device descriptor file memory 210 that identifies which device description files are associated with which types of hosts.

In some examples, the file retriever 208 may also provide a revision, version, and/or release date to the file processor 206. The file processor 206 may then check the revision, version, and/or release date of the stored device description file(s) with any device description files already installed at a host. Further, the file retriever 208 may configure a device description file based on instructions from the file processor 206. Alternatively, the file retriever 208 may provide the file processor 206 with the device description file to configure.

To transmit messages and/or device description file(s) to one or more hosts, the example file manager 102 of FIG. 2 includes a transmitter 212. The example transmitter 212 receives messages from the file processor 206, converts those messages into a format compatible with a process control communication protocol, and transmits the messages to the appropriate host via the communication path 112. In other examples, the transmitter 212 may transmit the messages to a communication processor within the field device 103.

The example transmitter 212 also transmits device description file(s) to the appropriate hosts (e.g., the host 106). To transmit a device description file, the transmitter 212 may packetize and/or convert the file for transmission along the communication path 112 by formatting the device description file to conform to an appropriate process control communication protocol. The example transmitter 212 may also buffer the device description file for transmission to one or more host(s). In these examples, the transmitter 212 may include multiple buffers to concurrently transmit the device description file to multiple hosts.

By transmitting the device description file to a host, the file manager 102 enables the host to display process data generated by the field device 103. Further, by transmitting the device description file to a host, the example file manager 102 ensures the host has the more recent and/or appropriate revision of the file. Transmitting the device description file also saves process control personnel time from having to access and install a device description file from, for example, a CD and/or a website of a manufacturer of the field device 103.

While the example file manager 102 has been illustrated in FIG. 2, one or more of the servers, platforms, interfaces, data structures, elements, processes and/or devices illustrated in FIG. 2 may be combined, divided, re-arranged, omitted, eliminated and/or implemented in any way. Further, the example receiver 202, the example device type identifier 204, the example file processor 206, the example file retriever 208, the example device description file memory 210, the example transmitter 212 and/or, more generally, the example file manager 102 may be implemented by hardware, software, firmware and/or any combination of hardware, software and/or firmware. Thus, for example, any of the example receiver 202, the example device type identifier 204, the example file processor 206, the example file retriever 208, the example device description file memory 210, the example transmitter 212 and/or, more generally, the example file manager 102 could be implemented by one or more circuit(s), programmable processor(s), application specific integrated circuit(s) (ASIC(s)), programmable logic device(s) (PLD(s)) and/or field programmable logic device(s) (FPLD(s)), etc.

When any apparatus claim of this patent is read to cover a purely software and/or firmware implementation, at least one of the example receiver 202, the example device type identifier 204, the example file processor 206, the example file retriever 208, the example device description file memory 210, and/or the example transmitter 212 are hereby expressly defined to include a computer readable medium such as a memory, DVD, CD, etc. storing the software and/or firmware. Further still, the example file manager 102 may include one or more elements, processes and/or devices in addition to, or instead of, those illustrated in FIG. 2, and/or may include more than one of any or all of the illustrated elements, processes and devices.

Figure 3:
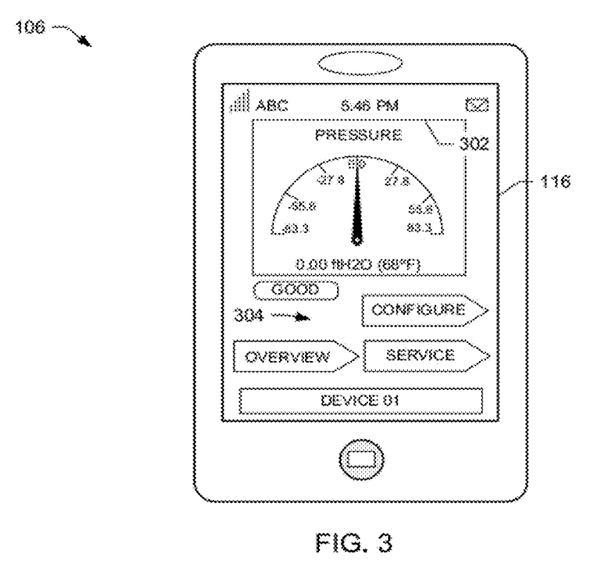
FIG. 3 shows a host as a wireless device displaying process data from a field device of FIGS. 1 and 2.

FIG. 3 shows the host 106 of FIG. 1 as a wireless device displaying process data from the field device 103 of FIGS. 1 and 2. The host 106 includes the user interface 116 as a portable display screen (e.g., a touch-screen). In this example, the host 106 is communicatively coupled to the controller 108 via the (wireless) LAN 114 and a gateway receiver (not shown). The user interface 116 includes a gauge graphic 302 and a menu graphic 304. While FIG. 3 shows one example display of process data from the field device 103, other device description files may define other ways to display process data.

The host 106 displays the graphics 302-304 using a device descriptor file transmitted by the file manager 102 of FIGS. 1 and 2. In this example, the file manager 102 detects that the host 106 of FIG. 3 is communicatively coupled to the field device 103 and transmits a message querying the host 106 if the host 106 includes a current version of the device description file. The host 106, in response, transmits a message with an electronic address of the host 106, an identifier of the host 106, and an indication that the host 106 does not include the device description file. In other examples, upon communicatively coupling to the LAN 114 and/or receiving process data from the field device 103, the host 106 may send a request to the file manager 103 for a corresponding device description file.

In the illustrated example, the file manager 102 uses the identifier of the host 106 to determine that the host 106 has a relatively small display screen (e.g., the interface 116) and selects a device description file configured to display process data from the field device 103 on the relatively small display screen. After receiving the device description file, the host 106 displays, via the user interface 116, the menu graphic 304 providing a list of functions for a user to select. The device description file specifies how each of the menu items in the menu graphic is to be displayed and includes a definition of the functionality associated with the menu items. In this example, a user selects an "Overview" menu item to view the gauge graphic 302.

The example gauge graphic 302 displays a pressure value (e.g., process data) reported by the field device 103. In this example, the device description file may define how the pressure value is to be displayed within the gauge graphic 302 and how the gauge graphic 302 is to be displayed (e.g., size, color, gauge numbers, pressure unit type, etc.). Additionally, the gauge graphic 302 includes a status indicator (e.g., "GOOD") that indicates a quality of the pressure value (e.g., process data). The field device 103 may report the pressure quality or, alternatively, the device description file may define the quality based on a comparison of the pressure value to one or more thresholds.

Figure 4:
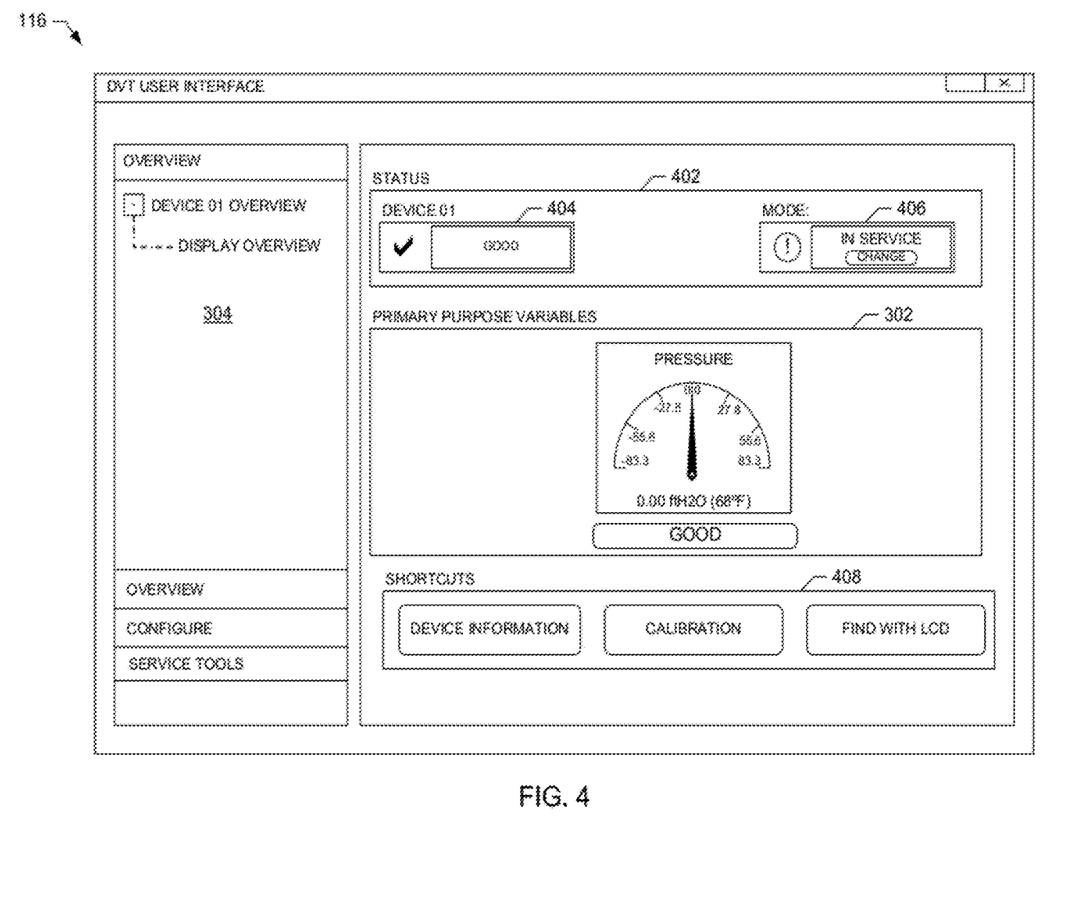
FIG. 4 shows the host as a computer displaying process data from the field device of FIGS. 1 and 2.

FIG. 4 shows the host 106 as, for example, a computer displaying process data from the field device 103 of FIGS. 1 and 2 via the user interface 116. In this example, the user interface 116 may include a process control application (e.g., DVT USER INTERFACE) displayed to a user in a display monitor. In this example, the file manager 102 receives an indication that the process data from the field device 103 is to be displayed via the host 106. The file manager 102 determines that the host 106 is associated with a relatively larger display screen and transmits to the host 106 a device description file configured for the larger display screen.

Similar to the user interface 116 of FIG. 3, the user interface 116 of FIG. 4 includes the gauge graphic 302 and the menu graphic 304. Because the user interface 116 has more displayable area, the device description file includes a definition to display the menu graphic 304 in a expanded format adjacent to the gauge graphic 302. Additionally, with more displayable area, the device description file also includes a definition for displaying a status panel 402 with a device status graphic 404 and a mode graphic 406. Further, the device description file includes a definition for displaying a shortcuts panel 408. In this manner, the file manager 102 selects a device description file to display process data from the field device 103 that is compatible with a display monitor (e.g., the user interface 116) of the host 106.

Figure 5:
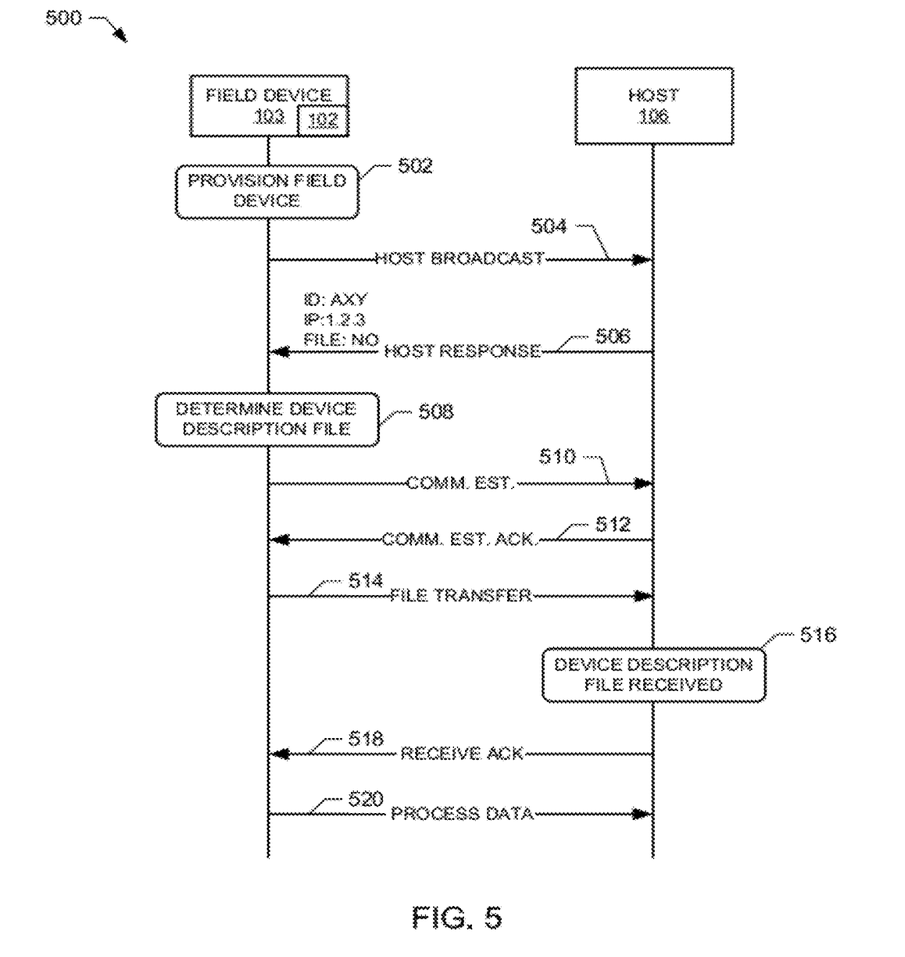
FIG. 5 shows an example message flow diagram of example messages used to transfer a device description file between the file manager and the host of FIGS. 1 and/or 2.

FIG. 5 shows an example message flow diagram 500 of example messages used to transfer a device description file between the file manager 102 and the host 106 of FIGS. 1 and/or 2. While FIG. 5 shows some example messages to transfer a device description file, other examples may use different types and/or numbers of messages (and/or packets) to transfer a device description file from the field device 103 to the host 106.

The field device 103 is provisioned within, for example, the process control system 104 (block 502). After the field device is provisioned, the file manager 102 transmits a host broadcast message 504. The host broadcast message 504 may also be transmitted to multiple hosts within the process control system. In this example, the host broadcast message 504 queries any hosts communicatively coupled to the field device 103 to send a response message including an electronic address of the host, an identifier of the host, and whether the host includes a device description file associated with the field device 103.

Upon receiving the host broadcast message 504, the host 106 transmits a host response message 506 that includes an identifier (e.g., "AXY"), an electronic address of the host 106 (e.g., "1.2.3"), and whether the host 106 includes the device description file (e.g., "NO"). In examples where the host 106 includes the device description file, the host 106 may also respond with a revision, a version, and/or a release date of the device description file. In other examples, the host 106 may transmit the host response message 506 unprompted (e.g., without receiving the host broadcast message 504) upon the host 106 communicatively coupling to the field device 103.

After receiving the host response message 506, the file manager 102 determines a device description file to transmit to the host 106 based on the information within the message 506 (block 508). The file manager 102 then transmits a communication establishment message 510 to create a communication link and/or a virtual circuit to the host 106. In other examples, the file manager 102 may transmit the communication establishment message 510 to verify the electronic destination (e.g., address) of the host 106. In response to the communication establishment message 510, the host 106 replies by transmitting to the field device 103 a communication establishment acknowledgment message 512 indicating a communication link to the host 106 is established.

After receiving the communication establishment acknowledgment message 512, the file manager 102 transmits the device description file via one or more file transfer messages 514. In response to receiving the device description file (block 516), the host 106 sends a file received acknowledgment message 518, which indicates to the file manager 102 that the device description file was received by the host 106. In some examples, the host 106 may transmit periodic communication establishment acknowledgment messages 512 as portions of the device description file are received. In this manner, the file manager 102 has feedback regarding the transmission of the device description file. For example, if the file manager 102 receives a message from the host 106 indicating that a portion of a device description file was not properly received, the file manager 102 can resend the un-received portion of the device description file.

After receiving the file received acknowledgment message 518 in the illustrated example, the file manager 102 instructs and/or enables the field device 103 to transmit process data to the host 106 (message 520). In some examples, the field device 103 may begin transmitting process data independent of the host 106 receiving the device description file. In these examples, the host 106 is only able to display the process data after receiving the device description file. In this manner, the example message flow diagram 500 shows that a device description file can be installed at the host 106 relatively quickly after the field device 103 is provisioned.

Figure 6:
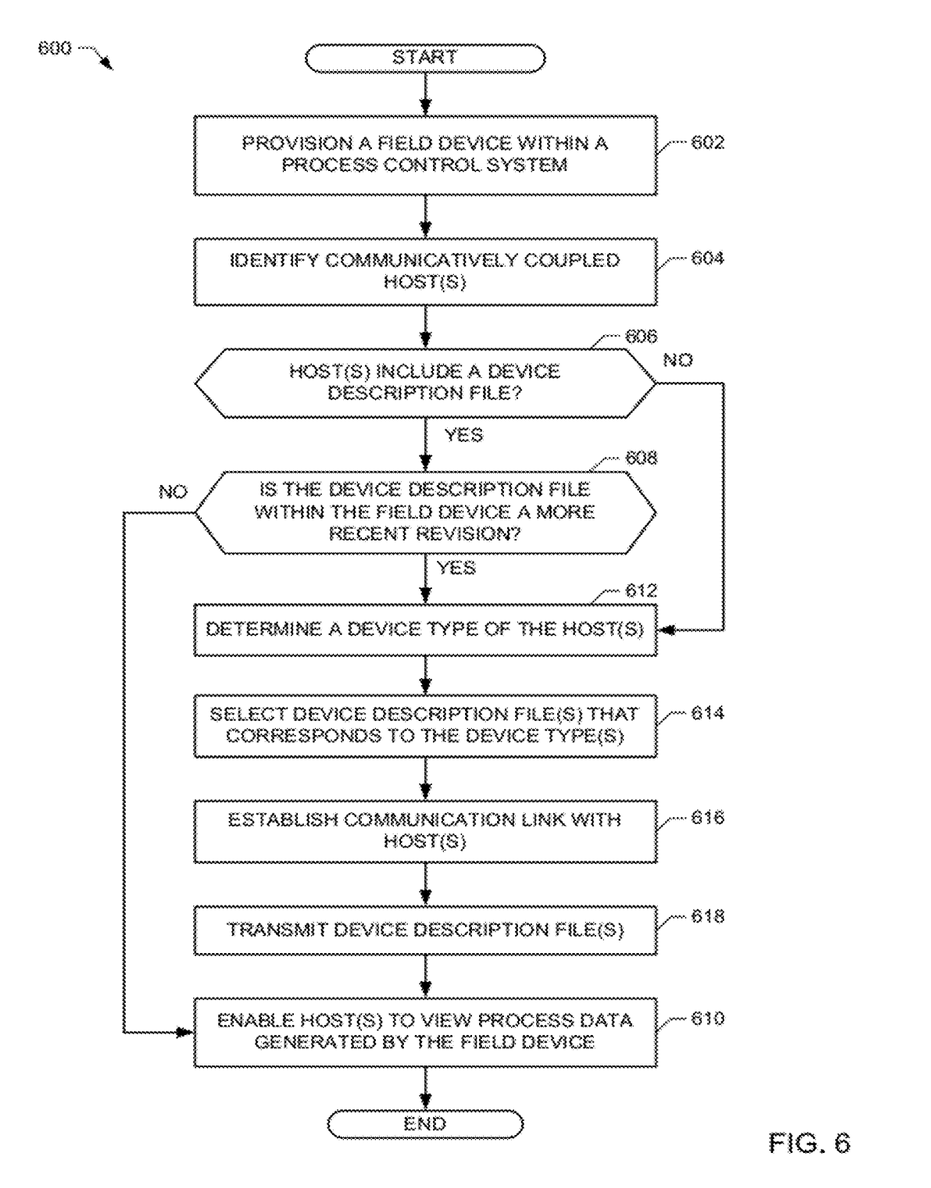
FIG. 6 is a flowchart of example methods that may be used to implement the file manager of FIGS. 1 and/or 2.

A flowchart representative of an example process 600 for implementing the example file manager 102 of FIGS. 1-2 is shown in FIG. 6. In this example, the process 600 may be implemented using the machine readable instructions in the form of a program for execution by a processor such as the processor P12 shown in the example processor system P10 discussed below in connection with FIG. 7. The program may be embodied in software stored on a computer readable medium such as a CD-ROM, a floppy disk, a hard drive, a digital versatile disk (DVD), or a memory associated with the processor P12, but the entire program and/or parts thereof could alternatively be executed by a device other than the processor P12 and/or embodied in firmware or dedicated hardware. Further, although the example program is described with reference to the flowchart illustrated in FIG. 6, many other methods of implementing the example file manager 102 may alternatively be used. For example, the order of execution of the blocks may be changed, and/or some of the blocks described may be changed, eliminated, or combined.

As mentioned above, the example process of FIG. 6 may be implemented using coded instructions (e.g., computer readable instructions) stored on a tangible computer readable medium such as a hard disk drive, a flash memory, a ROM, a CD, a digital versatile disk (DVD), a cache, a RAM and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. Additionally or alternatively, the example process of FIG. 6 may be implemented using coded instructions (e.g., computer readable instructions) stored on a non-transitory computer readable medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporary buffering, and/or for caching of the information). As used herein, the term non-transitory computer readable medium is expressly defined to include any type of computer readable medium and to exclude propagating signals.

The example process 600 of FIG. 6 transmits a device description file from a field device to a host. To transfer a device description file to multiple hosts, multiple instances of the example process 600 may be implemented or, alternatively, the example process 600 may transmit the device description file in parallel or in series to the hosts. The example process 600 of FIG. 6 begins by provisioning and/or configuring a field device within a process control system (block 602). The example process 600 (e.g., via the file manager 102 of FIGS. 1 and/or 2) may detect when the field device is provisioned. The example process 600 then identifies communicatively coupled hosts (e.g., via the file processor 206) (block 604). Identifying communicatively coupled hosts includes, for example, transmitting a host broadcast message and/or receiving a request for a device description file from a host.

The example process 600 next determines if any of the communicatively coupled host(s) include a device description file associated with the field device (e.g., via the file processor 206) (block 606). For hosts that include a device description file, the example process 600 determines if the device description file included within the hosts has a previous version, revision, and/or release date compared to the device description file stored within the field device and/or is otherwise incompatible with the field device (e.g., via the file processor 206 and/or the file retriever 208) (block 608). If the device description file in the host matches (e.g., have the same version, revision, and/or release data) the device description file stored in the field device, the example process 600 enables the hosts to view process data generated by the field device (e.g., via the file processor 206) (block 610). Enabling the host to view process data may include transmitting process data to the host. Because the host already has the appropriate device description file, the example process 600 may then terminate 600.

However, if the device description file within the hosts does not match the device description file stored in the field device (block 608) and/or if any of the hosts do not include the device description file (block 606), the example process 600 of FIG. 6 determines a device type for each of the hosts (e.g., via a device type identifier 204) (block 612). The example process 600 may use identification information provided by the hosts to determine a type or the types of the hosts. The example process 600 then selects a device description file that corresponds and/or conforms to each of the types of the hosts (e.g., via the file processor 206 and/or the file retriever 208) (block 614). The example process 600 may also configure the device description file(s) based on activated functionality of the field device.

The example process 600 of the illustrated example continues by establishing a communication link with each of the hosts (e.g., via the file processor 206 and/or the transmitter 212) (block 616). Establishing the communication link may include verifying an electronic address of the hosts and/or creating one or more virtual circuits to the hosts. After establishing a communication link, the example process 600 transmits the device description file from the field device to each of the hosts (e.g., via the transmitter 212) (block 618). The example process 600 then enables the each of the hosts to view process data generated by the field device via the device description file (block 610). Upon enabling the hosts to view process data from the field device via the device description file(s), the example process 600 terminates. In other examples, the example process 600 may wait until a request for the device description file is received from a newly communicatively coupled host.

Figure 7:
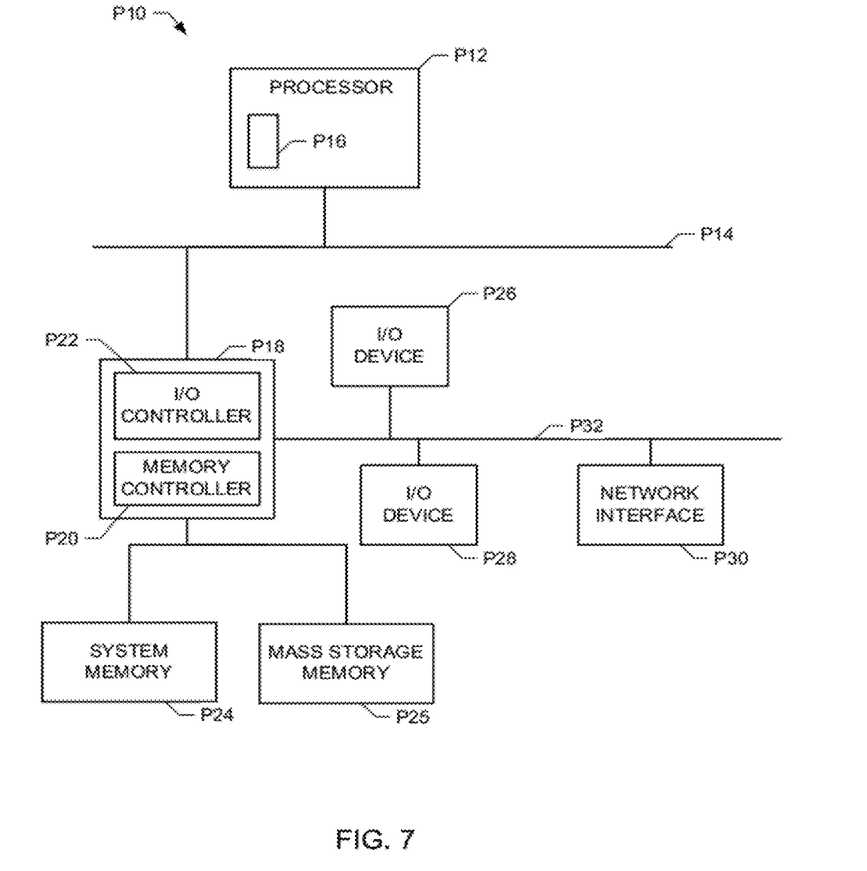
FIG. 7 is a block diagram of an example processor system that may be used to implement the example methods and apparatus described herein.

FIG. 7 is a block diagram of an example processor system P10 that may be used to implement the example methods and apparatus described herein. For example, processor systems similar or identical to the example processor system P10 may be used to implement the example receiver 202, the example device type identifier 204, the example file processor 206, the example file retriever 208, the example device description file memory 210, the example transmitter 212 and/or, more generally, the example file manager 102 of FIGS. 1 and/or 2. Although the example processor system P10 is described below as including a plurality of peripherals, interfaces, chips, memories, etc., one or more of those elements may be omitted from other example processor systems used to implement one or more of the example receiver 202, the example device type identifier 204, the example file processor 206, the example file retriever 208, the example device description file memory 210, the example transmitter 212 and/or, more generally, the example file manager 102.

As shown in FIG. 7, the processor system P10 includes a processor P12 that is coupled to an interconnection bus P14. The processor P12 includes a register set or register space P16, which is depicted in FIG. 7 as being entirely on-chip, but which could alternatively be located entirely or partially off-chip and directly coupled to the processor P12 via dedicated electrical connections and/or via the interconnection bus P14. The processor P12 may be any suitable processor, processing unit or microprocessor. Although not shown in FIG. 7, the system P10 may be a multi-processor system and, thus, may include one or more additional processors that are identical or similar to the processor P12 and that are communicatively coupled to the interconnection bus P14.

The processor P12 of FIG. 7 is coupled to a chipset P18, which includes a memory controller P20 and a peripheral input/output (I/O) controller P22. As is well known, a chipset typically provides I/O and memory management functions as well as a plurality of general purpose and/or special purpose registers, timers, etc. that are accessible or used by one or more processors coupled to the chipset P18. The memory controller P20 performs functions that enable the processor P12 (or processors if there are multiple processors) to access a system memory P24 and a mass storage memory P25.

The system memory P24 may include any desired type of volatile and/or non-volatile memory such as, for example, static random access memory (SRAM), dynamic random access memory (DRAM), flash memory, read-only memory (ROM), etc. The mass storage memory P25 may include any desired type of mass storage device. For example, if the example processor system P10 is used to implement the device description file memory 210 (FIG. 2), the mass storage memory P25 may include a hard disk drive, an optical drive, a tape storage device, etc. Alternatively, if the example processor system P10 is used to implement the device description file memory 210, the mass storage memory P25 may include a solid-state memory (e.g., a flash memory, a RAM memory, etc.), a magnetic memory (e.g., a hard drive), or any other memory suitable for mass storage in the device description file memory 210.

The peripheral I/O controller P22 performs functions that enable the processor P12 to communicate with peripheral input/output (I/O) devices P26 and P28 and a network interface P30 via a peripheral I/O bus P32. The I/O devices P26 and P28 may be any desired type of I/O device such as, for example, a keyboard, a display (e.g., a liquid crystal display (LCD), a cathode ray tube (CRT) display, etc.), a navigation device (e.g., a mouse, a trackball, a capacitive touch pad, a joystick, etc.), etc. The network interface P30 may be, for example, an Ethernet device, an asynchronous transfer mode (ATM) device, an 802.11 device, a DSL modem, a cable modem, a cellular modem, etc. that enables the processor system P10 to communicate with another processor system.

While the memory controller P20 and the I/O controller P22 are depicted in FIG. 7 as separate functional blocks within the chipset P18, the functions performed by these blocks may be integrated within a single semiconductor circuit or may be implemented using two or more separate integrated circuits.

At least some of the above described example methods and/or apparatus are implemented by one or more software and/or firmware programs running on a computer processor. However, dedicated hardware implementations including, but not limited to, application specific integrated circuits, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or systems described herein.

It should also be noted that the example software and/or firmware implementations described herein are stored on a tangible storage medium, such as: a magnetic medium (e.g., a magnetic disk or tape); a magneto-optical or optical medium such as an optical disk; or a solid state medium such as a memory card or other package that houses one or more read-only (non-volatile) memories, random access memories, or other re-writable (volatile) memories. Accordingly, the example software and/or firmware described herein can be stored on a tangible storage medium such as those described above or successor storage media. To the extent the above specification describes example components and functions with reference to particular standards and protocols, it is understood that the scope of this patent is not limited to such standards and protocols.

Additionally, although this patent discloses example methods and apparatus including software or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the above specification described example methods, systems, and machine-accessible medium, the examples are not the only way to implement such systems, methods and machine-accessible medium. Therefore, although certain example methods, systems, and machine-accessible medium have been described herein, the scope of coverage of this patent is not limited thereto. On the contrary, this patent covers all methods, systems, and machine-accessible medium fairly falling within the scope of the appended claims either literally or under the doctrine of equivalents.

What is claimed is:

1. A method to transmit device description files to a host, the method comprising:
    communicatively coupling a field device to the host to provision the field device within a process control system; and
    in response to the field device receiving an indication that the host does not include a version of a device description file that corresponds to a version of the field device:
        determining, at the field device, a configuration of the device description file to be transmitted to the host, the determination based on comparing a device type of the host to a list of device types, the configuration of the device description file based on a screen size characteristic of the device type of the host;
        accessing the device description file from a memory of the field device;
        transmitting the device description file from the field device to the host.

2. A method as defined in claim 1, further comprising transmitting a query from the field device to the host to cause the host to determine if the host includes the device description file.

3. A method as defined in claim 2, wherein the query further causes the host to determine if the host includes the version of the device description file.

4. A method as defined in claim 1, wherein the device description file is transmitted to the host in response to receiving a request from the host for the device description file.

5. A method as defined in claim 1, wherein the device description file is stored in a compressed format within the memory.

6. A method as defined in claim 1, wherein the device type of the host includes at least one of a model number of a process control handheld device, a type of a wireless device, a type of a processor, a type of a server type, or a type of a controller.

7. A method as defined in claim 1, wherein the device description file is configured based on activated functions of the field device.

8. A method as defined in claim 1, wherein the host refrains from accessing the device description file from a manufacturer of the field device after receiving the device description file from the field device.

9. A method as defined in claim 1, wherein the device description file enables the host to display process data generated by the field device.

10. An apparatus to transmit device description files to a host, the apparatus comprising:
    a device type identifier to identify a device type of a host communicatively coupled to a field device within a process control system based on comparing the device type of the host to a list of device types;
    a file processor to receive an indication that the host does not have a device description file that corresponds to a version of the field device;
    a file retriever to configure the device description file from a memory of the field device, the configuration associated with the device type of the host, the configuration of the device description file based on a screen size characteristic of the device type of the host; and
    a transmitter to transmit the device description file from the field device to the host.

11. An apparatus as defined in claim 10, wherein the field device is provisioned within the process control system before the device type identifier identifies the device type of the host.

12. An apparatus as defined in claim 10, wherein the file processor is to transmit a query to the host to determine if the host includes the device description file.

13. An apparatus as defined in claim 12, wherein the query is to determine if the host includes a version of the device description file that corresponds to the version of the field device.

14. An apparatus as defined in claim 10, wherein the transmitter is to transmit the device description file to the host in response to the file processor receiving a request from the host for the device description file.

15. An apparatus as defined in claim 10, wherein the file processor is to configure the device description file based on activated functions of the field device.

16. A tangible article of manufacture storing machine-readable instructions that, when executed, cause a machine to at least:
    provision a field device within a process control system;
    identify a host communicatively coupled to the field device;
    determine whether a message received by the field device indicates that the host does not include a device description file that corresponds to a version of the field device;
    in response to the determination that the host does not include the device description file that corresponds to the version of the field device, determine, at the field device, a configuration of the device description file to be transmitted to the host, the determination based on comparing a device type of the host to a list of device types, the configuration of the device description file based on a screen size characteristic of the device type of the host;

access the device description file from a memory of the field device; and transmit the device description file from the field device to the host.

17. A tangible article of manufacture as defined in claim 16, wherein the machine-readable instructions, when executed, cause the machine to transmit a query to the host to determine if the host includes the device description file.

18. A tangible article of manufacture as defined in claim 16, wherein the machine-readable instructions, when executed, cause the machine to transmit a query to the host to determine if the host includes a version of the device description file.

19. A method according to claim 1, wherein the field device is pre-configured to store the device description file in the memory prior to communicatively coupling the field device to the host.

20. A tangible article of manufacture as defined in claim 16, wherein the device description file is altered based on available functions of the field device.

* * * * *